United States Patent
Schweigert

(10) Patent No.: US 9,981,388 B2
(45) Date of Patent: May 29, 2018

(54) GRIPPER AND PROCESS FOR MANUFACTURING A GRIPPER

(71) Applicant: RÖHM GMBH, Sontheim/Brenz (DE)

(72) Inventor: Eduard Schweigert, Syrgenstein (DE)

(73) Assignee: Röhm GmbH, Sontheim/Brenz (DE)

( * ) Notice: Subject to any disclaimer, the term of this patent is extended or adjusted under 35 U.S.C. 154(b) by 0 days. days.

(21) Appl. No.: 15/247,073

(22) Filed: Aug. 25, 2016

(65) Prior Publication Data

US 2017/0057097 A1 Mar. 2, 2017

(30) Foreign Application Priority Data

Sep. 1, 2015 (DE) ........................ 10 2015 114 580

(51) Int. Cl.

| | |
|---|---|
| *B25J 15/00* | (2006.01) |
| *B33Y 10/00* | (2015.01) |
| *B33Y 80/00* | (2015.01) |
| *B25J 15/12* | (2006.01) |
| *B23Q 7/04* | (2006.01) |
| *B65G 47/90* | (2006.01) |
| *B25J 15/02* | (2006.01) |
| *B29C 64/00* | (2017.01) |
| *B29L 31/00* | (2006.01) |

(52) U.S. Cl.
CPC .......... *B25J 15/0028* (2013.01); *B23Q 7/046* (2013.01); *B25J 15/022* (2013.01); *B25J 15/12* (2013.01); *B29C 64/00* (2017.08); *B33Y 10/00* (2014.12); *B33Y 80/00* (2014.12); *B65G 47/908* (2013.01); *B29L 2031/727* (2013.01)

(58) Field of Classification Search
CPC ...... B25J 15/0028; B25J 15/12; B25J 15/022; B29C 67/0051; B29C 64/00; B33Y 10/00; B33Y 80/00; B29L 2031/727; B23Q 7/046; B65G 47/908
See application file for complete search history.

(56) References Cited

U.S. PATENT DOCUMENTS 4,141,138 A * 2/1979 Quick ................ H05K 13/0417
29/740
6,467,826 B2 * 10/2002 Stromberg ............... B21J 15/10
294/106

(Continued)

FOREIGN PATENT DOCUMENTS

| DE | 10 2008 055617 A1 | 5/2010 |
| DE | 10 2010 009259 A1 | 8/2011 |
| EP | 0 939 044 A1 | 9/1999 |

OTHER PUBLICATIONS

European Patent Office, Search Report in Application No. 16175417.1 dated Feb. 1, 2017 (9 pages).

(Continued)

*Primary Examiner* — Stephen A Vu

(74) *Attorney, Agent, or Firm* — McAndrews, Held & Malloy, Ltd.

(57) ABSTRACT

A gripper is described as including two lateral flanks that are directly or indirectly connected to each other at one end, generating a space between them containing an actuator whose lateral boundaries have at least one opening accessible from the outside. At least one reinforcement rib is allocated to at least one of the lateral flanks. A method for manufacturing the gripper is also described.

21 Claims, 4 Drawing Sheets

(56) References Cited

U.S. PATENT DOCUMENTS 8,011,708 B2 * 9/2011 Becker .................... B25J 9/142
　　　　　　　　　　　　　　　　　　　　　　294/196
9,505,135 B1 * 11/2016 Malstrom ................ B25J 15/12

OTHER PUBLICATIONS

European Patent Office, Search Report in Application No. 16175417.1 dated Feb. 1, 2017, with certified translation (19 pages).

* cited by examiner

GRIPPER AND PROCESS FOR MANUFACTURING A GRIPPER

CROSS-REFERENCE TO RELATED APPLICATIONS/INCORPORATION BY REFERENCE

This patent application makes reference to, claims priority to, and claims benefit from German Patent Application No. 10 2015 114 580.4, filed on Sep. 1, 2015. The above-identified application is hereby incorporated by reference herein in its entirety.

FIELD OF THE DISCLOSURE

Some embodiments of the present disclosure relate to a gripper and, in particular to a gripper with two lateral flanks that are directly or indirectly connected to each other at one end, generating between them a space including an actuator, with the lateral boundaries of the space possessing at least one opening that is accessible from the outside. Some embodiments of the present disclosure relate to a process for manufacturing the gripper.

BACKGROUND

Limitations and disadvantages of conventional and traditional approaches will become apparent to one of skill in the art, through comparison of such systems with the present disclosure as set forth in the remainder of the present application with reference to the drawings.

BRIEF SUMMARY

Systems, devices, and methods that provide a gripper are provided, substantially as illustrated by and/or described in connection with at least one of the figures, as set forth more completely in the claims.

DETAILED DESCRIPTION

Figure 1:
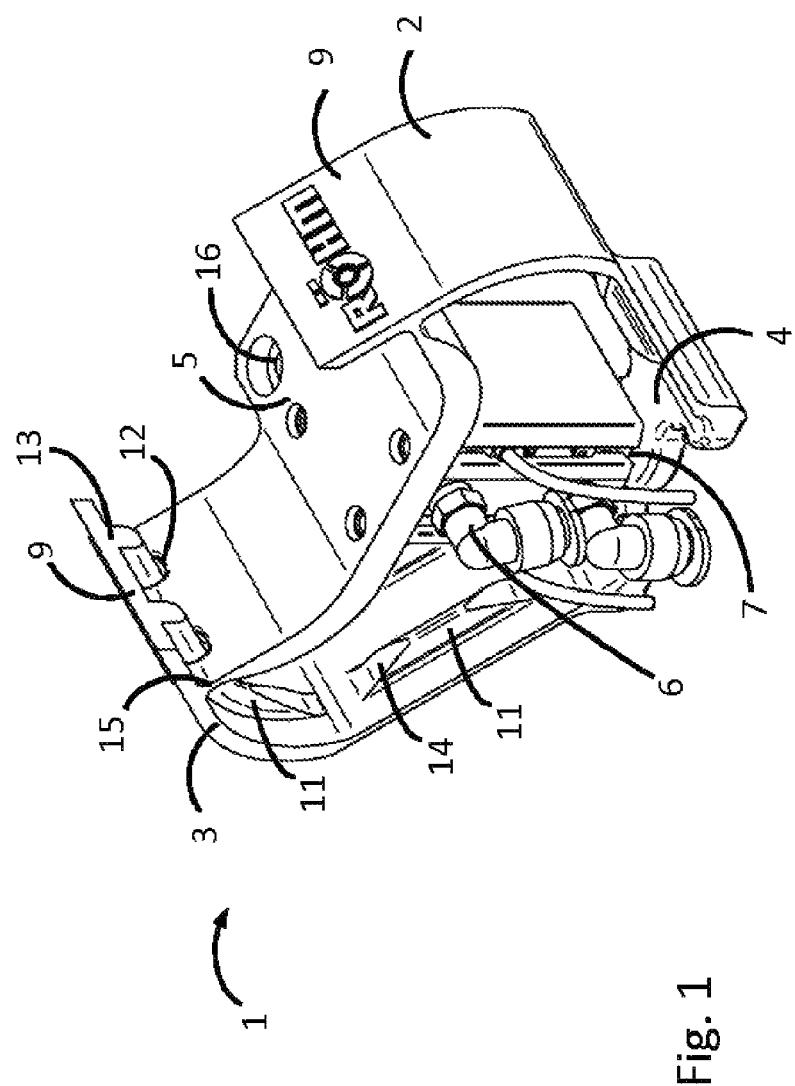
FIG. 1 shows a perspective view of an embodiment of a gripper according to the present disclosure.
Figure 2:
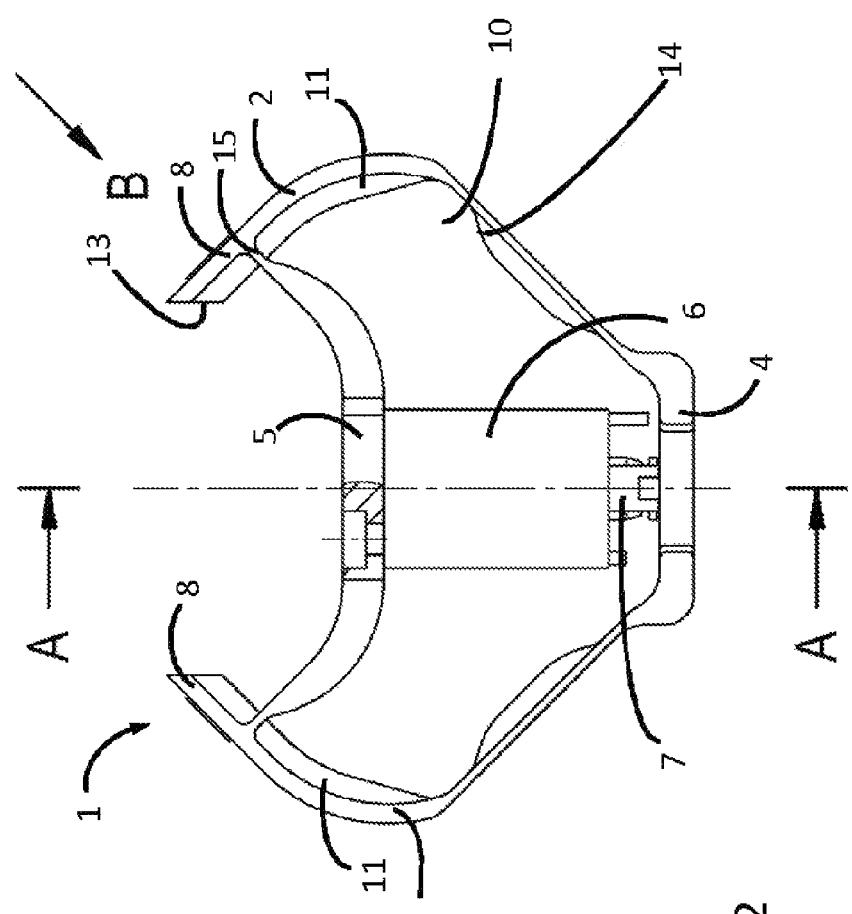
FIG. 2 shows a front view of the gripper shown in FIG. 1 according to the present disclosure.

Grippers (e.g., a Röhm gripper RRMG) are used, in particular, for gripping a work piece and changing its position relative to a processing or transport device. These grippers are also used for holding an object in place because, for example, a closure is to be screwed onto a threaded part. Such grippers have proven themselves in practice so that their areas of application have continued to expand and such grippers are also considered parts of robotic systems.

Some grippers have shown to have the disadvantage that, during the clamping or gripping process, their sections that grip the work piece(s) will deform, or evade the work piece when the actuator exerts an excessive force on these sections.

Some embodiments of the present disclosure provide a gripper with two lateral flanks that are directly or indirectly connected to each other at one end, generating between them a space containing an actuator, with the lateral boundaries of the space possessing at least one opening that is accessible from the outside Some embodiments of the present disclosure increase the gripping precision in the gripper to eliminate the disadvantage described above. Some embodiments of the present disclosure provide a process for manufacturing the gripper.

Some embodiments of the present disclosure provide a gripper that allocates at least one reinforcement rib to at least one of the lateral flanks.

The actuator is used to switch the gripper between two operating states, namely, between the opened configuration, in which the work piece to be gripped is positioned between the free ends of the lateral flanks, and the closed configuration, in which the work piece has been gripped. For switching between the two configurations, the actuator is used, which can be realized, in particular, as a cylinder actuated as a pressure mechanism. For switching the gripper configuration, the actuator also performs a movement. The reinforcement rib ensures that the free ends will not deform when the work piece is gripped, whereby increased stability is provided for the respective lateral flank. And consequently, the free ends will not evade the work piece to be gripped during the gripping process when increased pressure is being exerted by the actuator. Thus, the work pieces can be gripped even more securely or more firmly.

Some embodiments of the present disclosure provide a support plate that connects and is between the lateral flanks. The support plate keeps a distance from both flank ends. A work piece can be positioned on this support plate before it is subsequently gripped by the gripper during the switching of the lateral flanks into the closed configuration.

Some embodiments of the present disclosure provide that the support plate carries the actuator. In accordance with an example embodiment, it has been proven advantageous, in particular, if the actuator is coupled at one end to the support plate, and on the other end, to a base plate connecting the lateral flanks. During the switching of the actuator, a relative movement of the base plate with regard to the support plate will ensue, resulting in the lateral flanks being opened and closed.

In order to increase the elasticity of the gripper, some embodiments of the present disclosure provide that the support plate is permeated by at least one reinforcement rib. So, for example, the lateral flank may be formed completely—e.g., along the entire lateral flank—with a reinforcement rib.

A further increase in the elasticity of the gripper can be achieved by the support plate having a cutout or a recess in the area of the at least one reinforcement rib. The cutout or recess represents a space in which the reinforcement rib permeating the support plate can move so that the reinforcement rib can move, e.g., freely move, within the cutout or recess when the gripper is switched into the closed configuration. This ensures that the support plate will not counteract the movement of the reinforcement rib resulting from the switching of the lateral flanks. If a gripper does not provide this cutout around the reinforcement rib, the support plate material would counteract the movement of the reinforcement rib, thus making the actuation process harder for the actuator.

Some embodiments of the present disclosure provide that the reinforcement rib is positioned on the side of the lateral flank that faces the work piece. Some embodiments of the present disclosure provide that the at least one reinforcement rib ends substantially flush with at least one of the free ends. This allows the gripping area of the work piece to be heightened, resulting in an even more secure gripping process.

Some embodiments of the present disclosure provide a process for manufacturing a gripper in which the lateral flanks are produced in a generative or additive manufacturing step as one piece with the at least one reinforcement rib. By this process, the contact points between the lateral flanks and the at least one reinforcement rib are already embodied or integrated during the generative or additive manufacturing, thus bypassing the need to provide for the assembly of the at least one reinforcement rib to the lateral flanks after the fact, which might result in a weak point on the gripper. The use of the generative or additive manufacturing step also allows embodying or integrating the lateral flanks as one piece with the support plate, whereby an internal material cross-section at the contact point of the support plate and the lateral flanks can be formed in such a manner that high elasticity between the lateral flanks and the support plate is provided for. At the same time (concurrently or simultaneously), for example, the cutouts or recesses can also be produced by the generative or additive manufacturing process since a chipping or cutting tool can make cutouts or recesses in the support plate around the reinforcement ribs with great difficulty. The use of such tools might also result in unnecessary damage to the gripper.

FIGS. 1-5 show a gripper 1 having two lateral flanks 2, 3 that are configured to be curved and are, at one end, connected to each other by a base plate 4. Between lateral flanks 2, 3 and at a distance from their free ends, a support plate 5 is provided on which an actuator 6 is positioned, which is shown as a cylinder actuated by a pressure mechanism. From this cylinder, a translatorially adjustable piston rod 7 extends and is fastened to base plate 4 so that when cylinder rod 7 is switched, gripper 1 will be deformed, and a work piece can be gripped by the free ends 9 of lateral flanks 2, 3 acting as clamping jaws 8.

Lateral flanks 2, 3 generate between them a space in which the actuator 6 is arranged. This space generated by lateral flanks 2, 3 is open both in the front and in the rear, e.g., possesses two openings 10 accessible from the outside. To prevent user injuries, these openings may also be configured to be closed off or encapsulated (e.g., with a housing).

Figure 3:
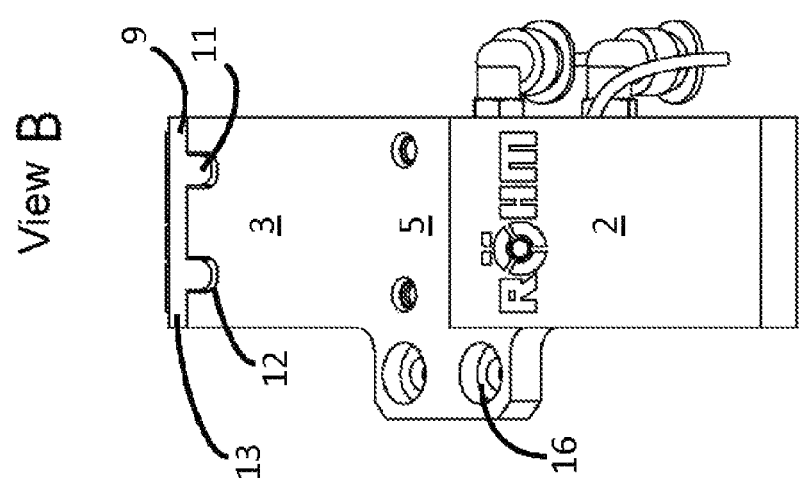
FIG. 3 shows view B of the gripper shown in FIG. 2 according to the present disclosure.
Figure 4:
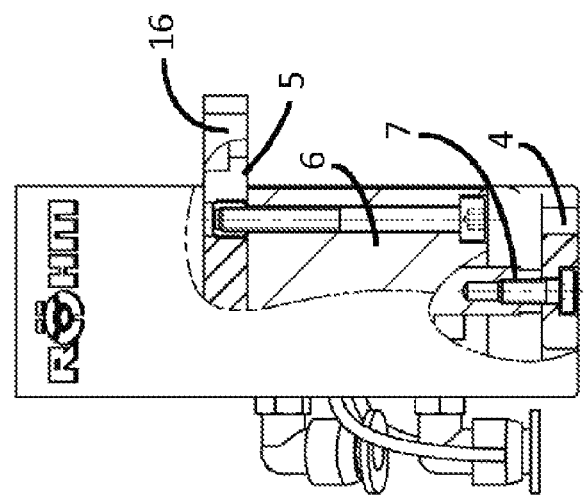
FIG. 4 shows cross section A-A of the gripper shown in FIG. 2 according to the present disclosure.
Figure 5:
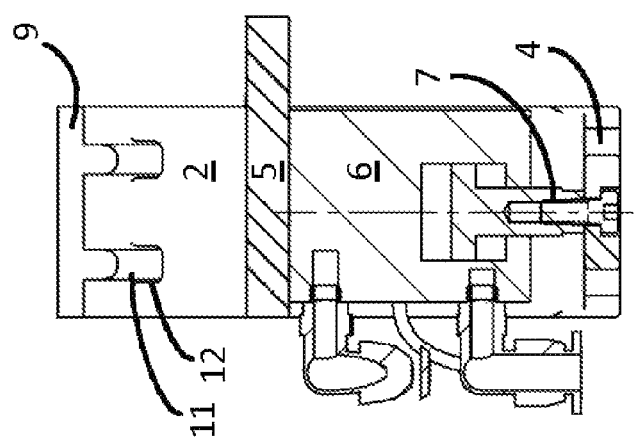
FIG. 5 shows a lateral view of the gripper shown in FIG. 1 as a partial section according to the present disclosure.

Lateral flanks 2, 3 have reinforcement ribs 11. As shown, reinforcement ribs 11 are stamped or arranged on the sides of lateral flanks 2, 3 facing the work piece. As can be seen in FIGS. 1, 3 and 4 in particular, support plate 5 is provided with a cutout or recess 12 in the area of reinforcement ribs 11 in such a manner that reinforcement ribs 11 move through support plate 5. For example, between reinforcement ribs 11 and support plate 5, there is a clearance in such a manner that when actuator 6 is actuated, reinforcement ribs 11 can move within cutout 12, thus providing increased elasticity of gripper 1.

In this example case, two of the reinforcement ribs 11 are provided in one each of lateral flanks 2, 3, which ribs permeate support plate 5. These reinforcement ribs 11 end flush with the free end 9 of lateral flanks 2, 3 so that gripping area 13 on the free ends 9 is heightened. Gripping area 13 is additionally heightened by the flat design of the free end 9 of lateral flanks 2, 3 and the flat design of the section of reinforcement rib 11 facing free end 9. As can further be seen, at least in the area of support plate 5, the reinforcement ribs 11 are—in analogy with lateral flanks 2, 3—configured to be curved. In addition, reinforcement ribs 11 have flattened areas 14 that counteract material fatigue. As can additionally be seen, reinforcement ribs 11 are substantially configured with a round cross-section, which also allows reducing the occurrence of material fatigue. Another embodiment of a gripper provides for configuring reinforcement ribs 11 with a profile, e.g., a T-profile, which further increases rigidity.

Gripper 1 shown in the drawings can be manufactured in a generative or additive manufacturing process in one piece including lateral flanks 2, 3 and reinforcement ribs 11 so that contact points 15 of side flanks 2, 3 with reinforcement ribs 11 and cutout or recess 12 can be formed directly during manufacturing. In order to be able to attach support plate 5 or gripper 1 to a robotic arm, installation openings 16 can be additionally stamped or formed on the support plate.

Then, the actuator 6 can be inserted through one opening 10 and coupled to the support plate 5 at one end; in particular, bolted.

REFERENCE LIST

| | |
|---|---|
| 1 | Gripper |
| 2 | Lateral flank |
| 3 | Lateral flank |
| 4 | Base plate |
| 5 | Support plate |
| 6 | Actuator |
| 7 | Cylinder rod |
| 8 | Clamping jaw |
| 9 | Free end |
| 10 | Opening |
| 11 | Reinforcement rib |
| 12 | Cutout |
| 13 | Gripping area |
| 14 | Flattened area |
| 15 | Contact point (support plate and lateral flank) |
| 16 | Installation opening |

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A gripper, comprising:
a first lateral flank and a second lateral flank that are coupled to each other at respective ends;
an actuator that is disposed in a space formed between the first flank and the second flank, wherein the space includes at least one opening that is externally accessible, and wherein one or both of the first lateral flank and the second lateral flank have at least one reinforcement rib; and
a support plate that is configured to connect the first lateral flank and the second lateral flank, wherein the support plate is located between the first lateral flank and the second lateral flank and is at a distance from free ends of the first lateral flank and the second lateral flank, wherein the support plate is configured to support the actuator, wherein a first end of the actuator is coupled to the support plate, and wherein a second end of the actuator is coupled to a base plate that connects the respective ends of the first lateral flank and the second lateral flank.

2. The gripper of claim 1, wherein the first lateral flank and the second lateral flank are indirectly coupled to each other at respective ends.

3. The gripper of claim 1, wherein the at least one reinforcement rib is configured to end substantially flush with at least one free end of the first lateral flank and the second lateral flank.

4. The gripper of claim 1, wherein the first lateral flank, the second lateral flank, and the at least one reinforcement rib are formed as a single integrated piece by a generative or additive manufacturing process.

5. The gripper of claim 1, wherein the support plate is configured to be permeated by the at least one reinforcement rib.

6. The gripper of claim 1, wherein the support plate has a cutout or a recess in an area of the at least one reinforcement rib.

7. The gripper of claim 1, wherein the support plate is configured with a cutout or a recess through which the at least one reinforcement rib passes.

8. A gripper, comprising:
   a first lateral flank and a second lateral flank that are coupled to each other at respective ends;
   an actuator that is disposed in a space formed between the first flank and the second flank, wherein the space includes at least one opening that is externally accessible, and wherein one or both of the first lateral flank and the second lateral flank have at least one reinforcement rib; and
   a support plate that is configured to connect the first lateral flank and the second lateral flank, wherein the support plate is located between the first lateral flank and the second lateral flank and is at a distance from free ends of the first lateral flank and the second lateral flank, and wherein the support plate is configured to be permeated by the at least one reinforcement rib.

9. The gripper of claim 8, wherein the support plate is configured to support the actuator, wherein a first end of the actuator is coupled to the support plate, and wherein a second end of the actuator is coupled to a base plate that connects the respective ends of the first lateral flank and the second lateral flank.

10. The gripper of claim 8, wherein the support plate has a cutout or a recess in an area of the at least one reinforcement rib.

11. The gripper of claim 8, wherein the support plate is configured with a cutout or a recess through which the at least one reinforcement rib passes.

12. A gripper, comprising:
   a first lateral flank and a second lateral flank that are coupled to each other at respective ends;
   an actuator that is disposed in a space formed between the first flank and the second flank, wherein the space includes at least one opening that is externally accessible, and wherein one or both of the first lateral flank and the second lateral flank have at least one reinforcement rib; and
   a support plate that is configured to connect the first lateral flank and the second lateral flank, wherein the support plate is located between the first lateral flank and the second lateral flank and is at a distance from free ends of the first lateral flank and the second lateral flank, and wherein the support plate has a cutout or a recess in an area of the at least one reinforcement rib.

13. The gripper of claim 12, wherein the support plate is configured to support the actuator.

14. The gripper of claim 13, wherein a first end of the actuator is coupled to the support plate.

15. The gripper of claim 12, wherein the support plate is configured to support the actuator, wherein a first end of the actuator is coupled to the support plate, and wherein a second end of the actuator is coupled to a base plate that connects the respective ends of the first lateral flank and the second lateral flank.

16. The gripper of claim 12, wherein the support plate is configured to be permeated by the at least one reinforcement rib.

17. The gripper of claim 12, wherein the support plate is configured with a cutout or a recess through which the at least one reinforcement rib passes.

18. A gripper, comprising:
   a first lateral flank and a second lateral flank that are coupled to each other at respective ends;
   an actuator that is disposed in a space formed between the first flank and the second flank, wherein the space includes at least one opening that is externally accessible, and wherein one or both of the first lateral flank and the second lateral flank have at least one reinforcement rib; and
   a support plate that is configured to connect the first lateral flank and the second lateral flank, wherein the support plate is located between the first lateral flank and the second lateral flank and is at a distance from free ends of the first lateral flank and the second lateral flank, and wherein the support plate is configured with a cutout or a recess through which the at least one reinforcement rib passes.

19. The gripper of claim 18, wherein the support plate is configured to support the actuator, wherein a first end of the actuator is coupled to the support plate, and wherein a second end of the actuator is coupled to a base plate that connects the respective ends of the first lateral flank and the second lateral flank.

20. The gripper of claim 18, wherein the support plate is configured to be permeated by the at least one reinforcement rib.

21. The gripper of claim 18, wherein the support plate has a cutout or a recess in an area of the at least one reinforcement rib.

* * * * *